July 22, 1947.
C. G. VEINOTT
2,424,344
SELF-COOLED RECTIFIER
Filed May 27, 1943
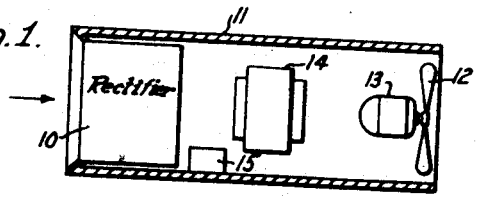
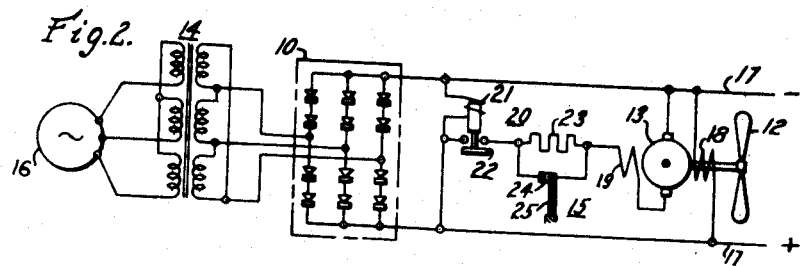
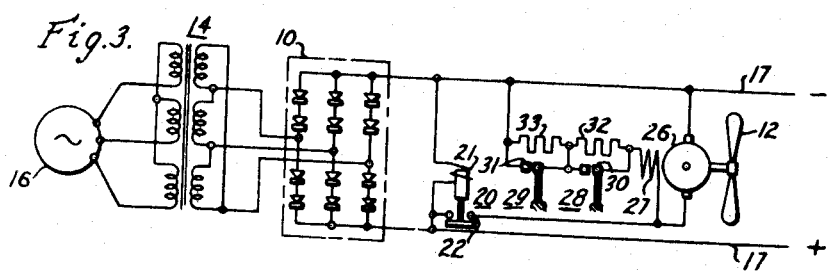
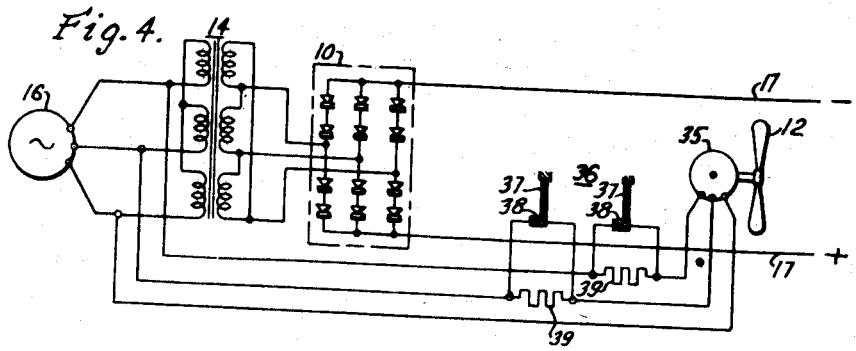
WITNESSES:
INVENTOR
Cyril G. Veinott.
BY
ATTORNEY Patented July 22, 1947

2,424,344

UNITED STATES PATENT OFFICE 2,424,344

SELF-COOLED RECTIFIER

Cyril G. Veinott, Lima, Ohio, assignor to Westinghouse Electric Corporation, East Pittsburgh, Pa., a corporation of Pennsylvania Application May 27, 1943, Serial No. 488,640

16 Claims. (Cl. 175—363)

1

The present invention relates to rectifiers of the dry or contact type and, more particularly, to a self-cooled rectifier assembly which is especially adapted for use on aircraft.

Modern aircraft, and especially certain types of military aircraft, have a very considerable electrical load, which is supplied from a generator carried on the airplane and driven by its engine. Direct-current systems supplied by direct-current generators have customarily been used, but with the increasing electrical loads on present-day airplanes it has become desirable to use alternating-current generators because of the greater output that can be obtained from a machine of given physical size and weight. The use of an alternating-current generator, however, necessitates the utilization of a rectifier to supply the direct-current load, and the present invention relates to a rectifier assembly which is particularly suitable for this service.

The rectifier of the present invention is of the dry or contact type, such as a copper-oxide or selenium rectifier, and preferably consists of a suitable number of rectifier plates arranged in a stack and suitably connected together electrically. Rectifiers for use on aircraft must be as small as possible and must be of light weight, but they must have a high degree of reliability and must be capable of supplying a relatively large output. These requirements make forced cooling of the rectifier essential. Aircraft generators are usually cooled by means of a blast tube connected to an air scoop which collects air from the forward motion of the plane through the air, and produces a strong blast of cooling air through the blast tube and the generator. Very good results are obtained in cooling generators in this way, but the use of a blast tube is less satisfactory for cooling a rectifier, because of the low thermal capacity of the rectifier plates, which results in rapid overheating when load is placed on the rectifier while the plane is on the ground where little or no cooling is obtained from the blast tube. For this reason, blast tube cooling is not entirely satisfactory for aircraft rectifiers, and the assembly of the present invention uses a motor-driven fan to produce the desired flow of cooling air through the rectifier.

The satisfactory cooling of aircraft rectifiers presents several problems which are not encountered in the design of rectifiers for other applications. Aircraft rectifiers must be highly reliable and of light weight, and they must be capable of supplying large outputs, which may be of the order of 24 kilowatts or more. Furthermore, such

2 rectifiers are required to operate under widely varying conditions of density and temperature of the cooling air. Thus, the density of the air at high altitudes may be as low as one-fifth of the density of the air at sea level, and the air may vary in temperature from 50° C. to as low as −70° C. The efficiency of a copper-oxide rectifier is dependent to a considerable degree on the temperature of the plates, and in order to obtain satisfactory operation under all conditions, the cooling system must take into account this wide range of variation of density and temperature of the cooling air, as well as the electrical heating effect in the rectifier itself, which varies with the load on the rectifier.

The principal object of the present invention is to provide a self-cooled rectifier assembly which is highly reliable and light in weight, and in which the rectifier is capable of satisfactory operation under widely varying conditions of density and temperature of the cooling air.

A further object of the invention is to provide a cooling system for an aircraft rectifier of the contact type in which the volume of cooling air is automatically varied in an inverse relation to the density of the air, so as to obtain adequate cooling of the rectifier at both high and low altitudes, as well as on the ground.

Another object of the invention is to provide a cooling system for a self-cooled rectifier of the contact type in which the volume of cooling air is automatically varied in response to changes in the temperature of the air, so as to keep the operating temperature of the rectifier within a predetermined range even though the temperature of the cooling air may vary over a much wider range.

Another object of the invention is to provide a cooling system for a self-cooled rectifier of the contact type in which the volume of cooling air is varied in response to changes in the temperature of the air and also in response to changes in the load on the rectifier.

A still further object of the invention is to provide a self-cooled rectifier assembly in which a motor-driven fan is provided to produce a flow of cooling air through the rectifier, and in which the speed of the motor is varied in response to changes in the density of the air, and also in response to changes in the temperature of the air and in the electrical load on the rectifier, so that the rectifier itself is kept within a predetermined temperature range in which the best performance is obtained.

A more specific object of the invention is to provide a self-cooled rectifier assembly, using a motor-driven fan to produce a flow of cooling air through the rectifier, in which the motor which drives the fan is of a type having a relatively high inherent speed-regulation, so that changes in load on the motor, resulting from changes in the density of the air, cause substantial changes in the speed of the motor to vary the volume of cooling air flowing through the rectifier in an inverse relation to the change in density, and in which thermally-responsive means for controlling the speed of the motor are provided to effect further changes in the speed of the motor in response to changes in the temperature of the air. The thermally-responsive means is preferably located so that it is responsive to the temperature of the air discharged from the rectifier so that changes in the heating effect of the load current of the rectifier are automatically taken into account.

The invention will be more fully understood from the following detailed description, taken in connection with the accompanying drawing, in which:

Figure 1 is a somewhat diagrammatic view illustrating the arrangement of a self-cooled aircraft rectifier assembly;

Fig. 2 is a schematic wiring diagram showing one embodiment of the invention; and Figs. 3 and 4 are similar wiring diagrams showing other embodiments of the invention.

Fig. 1 shows, more or less diagrammatically, the actual physical arrangement of the elements of a rectifier assembly intended for use on aircraft. The rectifier 10 is a rectifier of the dry plate type, preferably consisting of a pluraltiy of copper-oxide or selenium rectifier plates arranged in a stack or stacks with provision for the flow of cooling air between the plates, and suitably connected together electrically to form a three-phase bridge-type rectifier, as shown in Fig. 2. A suitable arrangement for the rectifier 10 is shown and claimed in the copending application of H. J. Braun, Serial No. 498,196, filed August 11, 1943, and assigned to Westinghouse Electric & Manufacturing Company, although any other suitable type of contact rectifier construction may also be used. The rectifier 10 is mounted in a case or housing 11, which provides mechanical support for the rectifier and directs the flow of cooling air. The rectifier is cooled by means of a fan 12 driven by a motor 13 mounted in the case 11, and arranged to produce a flow of cooling air through the rectifier and case in the direction of the arrow. A transformer 14 may also be mounted in the case 11, and a thermally-responsive control device 15 is preferably positioned in the case 11 in the path of the cooling air discharged from the rectifier 10 for a purpose to be explained hereinafter.

The rectifier 10 is supplied from an alternating-current generator 16, which is preferably a three-phase generator of any suitable construction, and which is driven by the engine of the airplane. The generator 16 is preferably wound for a relatively high voltage, such as 120 or 250 volts, and it is connected to the rectifier 10 through the three-phase transformer 14 to reduce the voltage supplied to the rectifier to the proper value to obtain the desired direct-current output voltage, which is usually of the order of 28 to 30 volts. The transformer 14 is not an essential part of the system, and may be omitted if the generator is wound for a low voltage, although it is usually desired to use a relatively high generator voltage in order to reduce the transmission line losses, since the rectifier may be located at a considerable distance from the generator.

The fan motor 13 is preferably a direct-current motor, supplied from the output of the rectifier 10, since the frequency of the engine-driven generator 16 may vary over a considerable range, and the speed of an alternating-current motor supplied from the generator would vary correspondingly. For this reason, it is preferred to use a direct-current motor to drive the fan, and the armature of the motor 13 is connected across the direct-current output leads 17 of the rectifier 10. The motor 13, as shown in Fig. 1, is a compound-wound motor, having a shunt field winding 18, which may be connected directly across the direct-current leads 17, and a series field winding 19 connected in series with the armature of the motor.

A voltage relay 20 is also shown in Fig. 2, having an operating coil 21 connected across the leads 17, and contacts 22 connected in the armature circuit of the motor 13. This relay 20 is not necessarily an essential part of the invention, but if the direct-current excitation of the generator 16 is supplied from the rectifier 10, as would usually be the case, the generator would be unable to build up its voltage when starting from rest if the motor 13 remained connected to the rectifier, since the armature circuit of the motor would constitute a direct short-circuit across the rectifier terminals. The relay 20 is provided in order to overcome this difficulty, and it is adjusted to drop out and disconnect the motor 13 from the rectifier 10 when the output voltage falls below a predetermined point. In starting, the motor remains disconnected until the generator voltage has built up to a sufficiently high value, when the relay 20 picks up and closes its contacts 22 to connect the motor 13 across the direct-current leads 17 to start it in operation.

As previously pointed out, aircraft rectifiers are required to operate under widely varying conditions of density of the cooling air, the density of the air at high altitudes being as low as one-fifth the density of the air on the ground at sea level. If the fan 12 were driven at the same speed under all conditions of air density, the same volume of air would flow through the rectifier at all times, and if this volume of air were just adequate for cooling at low altitudes or on the ground, it would not provide adequate cooling at high altitudes because of the reduced density of the air. If a sufficient volume of air were provided for adequate cooling at high altitudes, the rectifier would be over-cooled at low altitudes, and a larger and heavier fan motor would have to be used because the greater density of the air at low altitudes would require greater power to drive the fan. The lower temperature of the air at high altitudes tends to compensate to some extent for the reduced density, but, in general, a greater volume of air is required for adequate cooling at high altitudes than at low altitudes.

In order to effect an automatic compensation for the variation in air density, the motor 13 is designed to have relatively high inherent speed-regulation, so that as the load on the motor decreases, its speed increases. Any desired type of motor having this characteristic may be used, the motor 13 shown in Fig. 2 being a compound-wound motor. In some cases, however, it might be desirable to use a series motor, with or without a light shunt winding. It is preferable to use a motor which operates at relatively high speed even on the ground, in order to keep the size, and therefore the weight, of the motor and fan as small as possible. With a compound-wound motor, as shown in Fig. 2, the no-load speed, or the high-altitude speed, can be limited to a desired value by proper design of the shunt field winding, and any desired amount of speed-regulation can easily be obtained. The particular value of speed-regulation to be used depends, of course, upon a number of factors, including the design of the rectifier and the particular conditions under which the system is to operate.

The use of a motor with high inherent speed-regulation results in automatic compensation for the variation in air density since, as the density of the air decreases, the load on the motor decreases, and its speed therefore rises, thus increasing the volume of cooling air drawn through the rectifier by the fan, while an increase in air density causes an opposite effect. Thus, the volume of cooling air is automatically varied in an inverse relation to the density of the air, although not necessarily linearly, and the cooling effect is kept more nearly the same irrespective of changes in the density of the air.

The cooling system as so far described provides automatic compensation for variation in the density of the cooling air. The temperature of the air, however, also varies over a wide range, which may be from as low as −70° C. at high altitudes to as high as +50° C. or higher on the ground in hot weather or in warm climates. The efficiency of dry plate rectifiers is dependent to a considerable extent on the temperature of the plates, being highest in a temperature range of the order of 40° C. to 50° C., and as the temperature drops, the efficiency also decreases, becoming noticeably low at −10° C. and becoming very poor at −40° C. and lower temperatures. It is necessary, therefore, for the operation of the cooling system to be such that it limits the variation in temperature of the rectifier itself to a very much narrower range than the variation in ambient temperature, and the heating effect of the load on the rectifier should also be taken into account. Thus, an adequate volume of cooling air must be provided for heavy load conditions at high ambient temperatures, and if there were no means for changing the speed of the fan motor 13 other than its inherent speed-regulation, there would be too much cooling for light load conditions, and low ambient temperatures, such as at high altitudes, and under the latter conditions the rectifier would be overcooled, and its efficiency and performance would become quite poor. The present invention, therefore, provides means for changing the speed of the motor 13 in accordance with changes in the temperature of the cooling air, and preferably also in accordance with the load on the rectifier.

In order to accomplish this result in the embodiment of the invention shown in Fig. 2, a suitable resistance 23 is connected in series with the armature of the motor 13. The resistance 23 is short-circuited by the normally closed contacts 24 of the thermally-responsive device 15, which is shown as having a bimetallic element 25 for actuating the contacts 24. As previously stated, the thermally-responsive device 15 is placed in the path of the cooling air, and preferably in the path of the air discharged from the rectifier 10, and is so arranged that its contacts 24 are normally closed but are opened when the temperature of the bimetallic element 25 falls below a predetermined point. Thus, when the temperature of the air is above this predetermined temperature, the resistance 23 is short-circuited by the thermally-responsive device 15, but when the temperature of the air falls below this point, indicating that less cooling is required, the contacts 24 are opened, inserting the resistance 23 in the armature circuit of the motor 13, and thereby reducing its speed to reduce the volume of cooling air flowing through the rectifier. In this way, the volume of cooling air is reduced when the temperature is low and increased when the temperature is high.

The thermally-responsive device 15 may be placed in any location in which it is subjected to the temperature of the cooling air. If it is positioned in the path of the air before it enters the rectifier, the desired variation in motor speed will be effected solely in response to the ambient temperature. In this position, however, variations in the load on the rectifier are not taken into account, and the same amount of cooling would be provided for light loads as for heavy loads. It is preferred, therefore, to place the thermally-responsive device 15 immediately adjacent the rectifier on the side from which the cooling air is discharged, as shown in Fig. 1, so that it is subjected to the temperature of the air discharged from the rectifier, which is a function of both the ambient air temperature and the load on the rectifier. In this position, the thermally-responsive device 15 attempts to keep the temperature of the air discharged from the rectifier constant, and thus takes into account the load on the rectifier as well as the temperature of the incoming air. The invention is not restricted, however, to this specific location of the thermally-responsive device, since it may be placed in other locations, such as between the transformer 14 and the motor 13, in which position the heating of the transformer would also have an effect and which is not as desirable as the position shown for that reason. Any suitable location may be used, however, within the scope of the invention, where the thermal device 15 is subjected to a temperature which bears some relation to the ambient temperature of the cooling air, and preferably also to the load on the rectifier.

The system shown in Fig. 2 provides for only one step of adjustment in the fan motor speed. Obviously, better results can be obtained by using two or more steps, which can be done by using a corresponding number of thermally-responsive control devices set to operate at different temperatures. Fig. 3 shows a system providing two steps of adjustment of the speed of the fan motor, and also embodying a different method of speed control.

In Figure 3, the motor 26 which drives the fan 12 is shown as a shunt-wound motor, having a shunt field winding 27 which is connected as before across the direct-current output leads 17 of the rectifier 10, the other elements of the system being the same as described before. The motor 26 is designed to have high inherent speed-regulation to effect automatic compensation for variation in air density, as previously described. In this embodiment of the invention, two thermally-responsive devices 28 and 29 are provided, which are preferably positioned in the path of the cooling air discharged from the rectifier, as previously described for the thermally-responsive device 15. The thermal devices 28 and 29, however, have contacts 30 and 31, respectively, which are normally open and which are closed when the temperature drops below the temperatures for which the respective devices 28 and 29 are adjusted. Field resistors 32 and 33 are connected in series with the shunt field winding 27 of the motor 26, and when the temperature of the cooling air discharged from the rectifier 10 falls below a predetermined point, the thermally-responsive device 28 closes its contacts 30, and short-circuits the field resistor 32, thus increasing the field current in the shunt field winding 27 of the motor 26 and decreasing the speed of the motor. If the temperature of the cooling air decreases still further, indicating that there is still too much cooling, the thermally-responsive device 29, which is set to operate at a lower temperature, closes its contacts 31, removing the field resistor 33 from the circuit, and further strengthening the shunt field 27, so that the speed of the motor 26 is further decreased to decrease the cooling effect still more.

It will be apparent that in either of the embodiments of the invention shown in Figs. 2 and 3, any desired number of thermally-responsive devices could be provided to effect as many steps of fan motor speed as might be desirable. The motor 26 in Fig. 3 is shown as being a shunt motor, which is designed to have inherently a high speed-regulation, as stated above, but if desired or necessary a series field winding might also be provided, as in Fig. 2, to obtain the required change in speed with change in density of the cooling air. It will also be apparent that any suitable method of speed control may be used to effect changes in speed of the fan motor when the thermally-responsive device or devices operate, two well-known methods of speed control for direct-current motors being shown in Figs. 2 and 3, respectively.

As previously stated, it is usually preferred to use a direct-current motor, connected across the output leads of the rectifier 10, to drive the fan 12, because of the varying frequency of the generator 16, which is driven directly from the aircraft engine. If the generator 16 were driven at constant speed, however, or if its frequency were maintained substantially constant by any means, it would be preferable to use an alternating-current motor, and Fig. 4 shows an embodiment of the invention using a motor of this type. In this figure, the fan 12 is driven by a three-phase induction motor 35, which is connected directly to the three-phase leads of the generator 16. The motor 35 is shown as being connected on the high-voltage side of the transformer 14, but it will be obvious that it might be connected on the low-voltage side if desired. The motor 35 is preferably a high-slip motor, so that it has high inherent speed-regulation, to obtain the desired variation in motor speed with change in density of the cooling air, as discussed above.

The desired variation in speed of the motor 35 in response to change in temperature of the air may be obtained in any desired manner. As shown in Fig. 4, a two-pole thermally-responsive device 36 is provided having two bimetallic elements 37 and two sets of contacts 38 which are arranged to normally short-circuit resistors 39 connected in series with two of the three phases of the motor primary winding. When the temperature of the cooling air decreases below the desired value, the bimetallic elements 37 open the contacts 38 to insert the resistances 39 in series with the primary winding of the motor 35, and thus decrease its speed to decrease the cooling effect. It will be apparent that any well-known method of speed control could be used, such as reducing the voltage on the primary winding of the motor, or changing the number of poles, or any other suitable means of speed control which could be actuated by the thermally-responsive device 36. It will also be obvious that two or more thermally-responsive devices could be used to obtain a corresponding number of steps of adjustment in the fan motor speed. Thus, the embodiment of the invention shown in Fig. 4 operates in a similar manner to those previously described, although it uses an alternating-current motor rather than a direct-current motor.

It should now be apparent that a self-cooled rectifier assembly has been provided which is particularly adapted for use on aircraft and which has numerous advantages. The efficiency and flexibility of the cooling system insure a high degree of reliability of the rectifier, while the very effective cooling provided permits the use of rectifier plates of minimum dimensions so as to obtain a design of small size and light weight. The use of a motor having high inherent speed-regulation is an important feature of the invention since it provides for automatic variation in speed of the motor to produce a variation in the volume of cooling air in an inverse relation to the density of the air, so that the effect of changes in the density of the air is eliminated, and substantially the same cooling effect is obtained at any altitude. The thermostatic control of the motor speed introduces further changes in speed of the motor in accordance with changes in the air temperature, and preferably also in accordance with changes in the load on the rectifier, insofar as such changes affect the temperature. Thus, the system operates to provide the correct volume of cooling air under any conditions and insures high efficiency and good performance of the rectifier.

The use of a motor of high speed-regulation also has another advantage over the use of a motor of substantially constant-speed type. If a constant-speed motor were used its speed would have to be great enough to provide adequate cooling at high altitudes with low-density air, but this speed would be greater than required on the ground, and because of the higher air density, a larger and more powerful motor would have to be used. Thus, the use of a motor with high speed-regulation permits the use of a smaller, and therefore lighter, motor which is an important consideration in the design of equipment for use on aircraft.

It is to be understood that although certain illustrative embodiments of the invention have been shown and described, the invention is capable of various other embodiments and modifications. Thus, any desired method of speed control may be used to effect the variation in speed under control of the thermally-responsive device or devices, and any desired number of such devices may be used to give a corresponding number of steps of speed variation. Similarly, various other changes and modifications might be made within the scope of the invention, and it is to be understood therefore that the invention in its broadest aspects includes all equivalent modifications or embodiments which come within the scope of the appended claims.

I claim as my invention:

1. In combination, a rectifier device of the contact type, a fan adjacent said rectifier device for producing a flow of cooling air through the rectifier device, and an electric motor for driving said fan, said electric motor being of a type in which a substantial change of speed occurs when the load on the motor changes.

2. In combination, a rectifier device of the contact type, a fan adjacent said rectifier device for producing a flow of cooling air through the rectifier device, and an electric motor for driving said fan, said electric motor being of a type in which the inherent speed-regulation of the motor is relatively high, so that a substantial change in the motor speed occurs when the density of the air changes, whereby the volume of air flowing through the rectifier device is varied in an inverse relation to changes in the density of the air.

3. In combination, a rectifier device of the contact type, and ventilating means for producing a flow of cooling air through the rectifier device, said ventilating means including means for varying the volume of air flowing through the rectifier device in response to changes in the temperature of the air and in the electrical load on the rectifier device.

4. In combination, a rectifier device of the contact type, and ventilating means for producing a flow of cooling air through the rectifier device, said ventilating means including temperature-responsive means for effecting changes in the volume of air flowing through the rectifier device in accordance with changes in the temperature of the air and in the electrical load on the rectifier device.

5. In combination, a rectifier device of the contact type, a fan adjacent said rectifier device for producing a flow of cooling air through the rectifier device, an electric motor for driving said fan, and temperature-responsive means for effecting changes in the speed of said motor in response to changes in the temperature of the air and in the electrical load on the rectifier device.

6. In combination, a rectifier device of the contact type, a fan adjacent said rectifier device for producing a flow of cooling air through the rectifier device, an electric motor for driving said fan, and temperature-responsive means for controlling the speed of said motor, said temperature-responsive means being operative to decrease the speed of the motor when the temperature of the cooling air is low and the electrical load on the rectifier device is light.

7. In combination, a rectifier device of the contact type, and ventilating means for producing a flow of cooling air through the rectifier device, said ventilating means being adapted to effect changes in the volume of air flowing through the rectifier device in response to changes in the density of the air and in the temperature of the air.

8. In combination, a rectifier device of the contact type, and ventilating means for producing a flow of cooling air through the rectifier device, said ventilating means being adapted to effect changes in the volume of air flowing through the rectifier device in response to changes in the density of the air, the temperature of the air and the electrical load on the rectifier device.

9. In combination, a rectifier device of the contact type, and ventilating means for producing a flow of cooling air through the rectifier device, said ventilating means including means for varying the volume of cooling air in an inverse relation to the density of the air, and means for varying the volume of cooling air in response to changes in the temperature of the air.

10. In combination, a rectifier device of the contact type, and ventilating means for producing a flow of cooling air through the rectifier device, said ventilating means including means for varying the volume of cooling air in an inverse relation to the density of the air, and means for varying the volume of cooling air in response to changes in the temperature of the air and in the electrical load on the rectifier device.

11. In combination, a rectifier device of the contact type, a fan adjacent said rectifier device for producing a flow of cooling air through the rectifier device, an electric motor for driving said fan, said electric motor being of a type in which a substantial change in the motor speed occurs when the load on the motor changes, whereby the volume of cooling air flowing through the rectifier device is varied in an inverse relation to the density of the air, and temperature-responsive means for effecting further changes in the speed of the motor in response to changes in the temperature of the air.

12. In combination, a rectifier device of the contact type, a fan adjacent said rectifier device for producing a flow of cooling air through the rectifier device, an electric motor for driving said fan, said electric motor being of a type in which a substantial change in the motor speed occurs when the load on the motor changes, whereby the volume of cooling air flowing through the rectifier device is varied in an inverse relation to the density of the air, and temperature-responsive means for effecting further changes in the speed of the motor in response to changes in the temperature of the air and in the electrical load on the rectifier device.

13. In combination, a rectifier device of the contact type, a fan adjacent said rectifier device for producing a flow of cooling air through the rectifier device, an electric motor for driving said fan, said electric motor being of a type in which a substantial change in the motor speed occurs when the load on the motor changes, whereby the volume of cooling air flowing through the rectifier device is varied in an inverse relation to the density of the air, and temperature-responsive means for controlling the speed of the motor, said temperature-responsive means being operative to effect a decrease in the speed of the motor when the temperature of the cooling air falls below a predetermined temperature.

14. In combination, a rectifier device of the contact type, a fan adjacent said rectifier device for producing a flow of cooling air through the rectifier device, an electric motor for driving said fan, said electric motor being of a type in which a substantial change in the motor speed occurs when the load on the motor changes, whereby the volume of cooling air flowing through the rectifier device is varied in an inverse relation to the density of the air, and temperature-responsive means for controlling the speed of the motor, said temperature-responsive means being disposed in the path of cooling air discharged from the rectifier device and being operative to effect a decrease in the speed of the motor when the temperature of said discharged air falls below a predetermined temperature.

15. In combination, a rectifier device of the contact type, and ventilating means for producing a flow of cooling air through the rectifier device, said ventilating means including a fan, and means for driving the fan, said driving means being adapted to change its speed in response to changes in load, whereby the speed of the fan is changed when the density of the cooling air changes.

16. In combination, a rectifier device of the contact type, and ventilating means for producing a flow of cooling air through the rectifier device, said ventilating means including a fan, and means for driving the fan, said driving means being of a type in which the speed increases when the load decreases, whereby the volume of air flowing through the rectifier device is varied in an inverse relation to changes in density of the air.

CYRIL G. VEINOTT.

REFERENCES CITED

The following references are of record in the file of this patent:

UNITED STATES PATENTS

| Number | Name | Date |
| --- | --- | --- |
| 2,196,022 | Moyer | Apr. 2, 1940 |
| 2,125,138 | Vogel | July 26, 1938 |
| 1,959,513 | Weyandt | May 22, 1934 |
| 2,112,093 | Harty | Mar. 22, 1938 |
| 2,128,090 | Hintze | Aug. 23, 1938 |
| 2,032,572 | Hammers et al. | Mar. 3, 1936 |
| 2,158,979 | Breisch | May 16, 1939 |
| 2,256,757 | Durand | Sept. 23, 1941 |
| 1,259,371 | Davis | Mar. 12, 1918 |
| 2,124,981 | Krackowizer | July 26, 1938 |
| 2,346,837 | Grooms | Apr. 18, 1944 |

FOREIGN PATENTS

| Number | Country | Date |
| --- | --- | --- |
| 480,202 | Germany | July 30, 1929 |
| 580,067 | Germany | July 5, 1933 |
| 418,748 | Great Britain | Jan. 1935 |